(12) United States Patent
Abbondanzio et al.

(10) Patent No.: US 8,799,919 B2
(45) Date of Patent: Aug. 5, 2014

(54) LOAD BALANCING MANAGEMENT OF NEWLY DISCOVERED DATA PROCESSING SYSTEMS USING PEER CONTROL POINTS

(75) Inventors: Antonio Abbondanzio, Raleigh, NC (US); Shamsundar Ashok, Austin, TX (US); NicoleLyne Jones, Cedar Park, TX (US); Dennis Duane Jurgensen, Cary, NC (US); Rolf Kocheisen, Pflugerville, TX (US); Yan Schloem Koyfman, Wappingers Falls, NY (US); Sherry Michelle Pitz, Raleigh, NC (US); Peter Andrew Richman, Saugerties, NY (US); Devon Daniel Snyder, Cary, NC (US); William John Vanca, Chapel Hill, NC (US); Philip Kincheloe Warren, Austin, TX (US); Robert Edward Warren, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1768 days.

(21) Appl. No.: 11/741,134

(22) Filed: Apr. 27, 2007

(65) Prior Publication Data
US 2008/0271037 A1    Oct. 30, 2008

(51) Int. Cl.
*G06F 9/46* (2006.01)
(52) U.S. Cl.
USPC ........................................................ 718/105
(58) Field of Classification Search
CPC ..... G06F 9/505; G06F 9/5083; G06F 9/5088; H04L 29/08144; H04L 29/08171
See application file for complete search history.

(56) References Cited

U.S. PATENT DOCUMENTS

| | | | |
|---|---|---|---|
| 4,484,270 A | 11/1984 | Quernemoen et al. | |
| 6,006,292 A | 12/1999 | Young | |
| 6,078,960 A | 6/2000 | Ballard | |
| 6,950,849 B1 | 9/2005 | Brandstatter | |
| 6,968,555 B2 | 11/2005 | Frazier et al. | |
| 7,203,944 B1 * | 4/2007 | van Rietschote et al. | 718/104 |
| 8,223,770 B2 * | 7/2012 | Wray et al. | 370/392 |
| 2002/0147854 A1 | 10/2002 | Frazier et al. | |

FOREIGN PATENT DOCUMENTS

EP        0062463 A1    10/1982

OTHER PUBLICATIONS

Yoshikawa et al., "Using Smart Clients to Build Scalable Services", Proceedings of the Usenix annual Technical Conference, Jan. 6, 1997, pp. 105-117.

(Continued)

*Primary Examiner* — Abdullah Al Kawsar
*Assistant Examiner* — Eric C Wai
(74) *Attorney, Agent, or Firm* — Yee & Associates, P.C.; Steven L. Bennett

(57) ABSTRACT

A computer implemented method, apparatus, and computer usable program code for balancing management loads. Loads are analyzed for a plurality of hardware control points to form an analysis in response to receiving a notification from a hardware control point indicating that a new manageable data processing system has been discovered. One of the plurality of hardware control points is selected using the analysis to form a selected hardware control point. The message is sent to the selected hardware control point to manage the new manageable data processing system, wherein the selected hardware control point manages the new manageable data processing system.

13 Claims, 5 Drawing Sheets

(56) References Cited

OTHER PUBLICATIONS

Kim et al., "HACM: High-Availability Cluster Management Tool for Cluster DBMS", Proceedings of 16th International Workshop on Database and Expert Systems Applications, Aug. 22, 2005, pp. 333-337.

Kim et al., "Highly Available and Efficient Load Cluster Management System using SNMP and Web", 2002 IEEE/IFIP Network Operations and Management Symposium, 2002, Florence, Italy, Apr. 2002, pp. 619-632.

"IBM Cluster Systems Management for AIX 5L and Linux", IBM Corporation, Oct. 14, 2003, 16 pages.

* cited by examiner

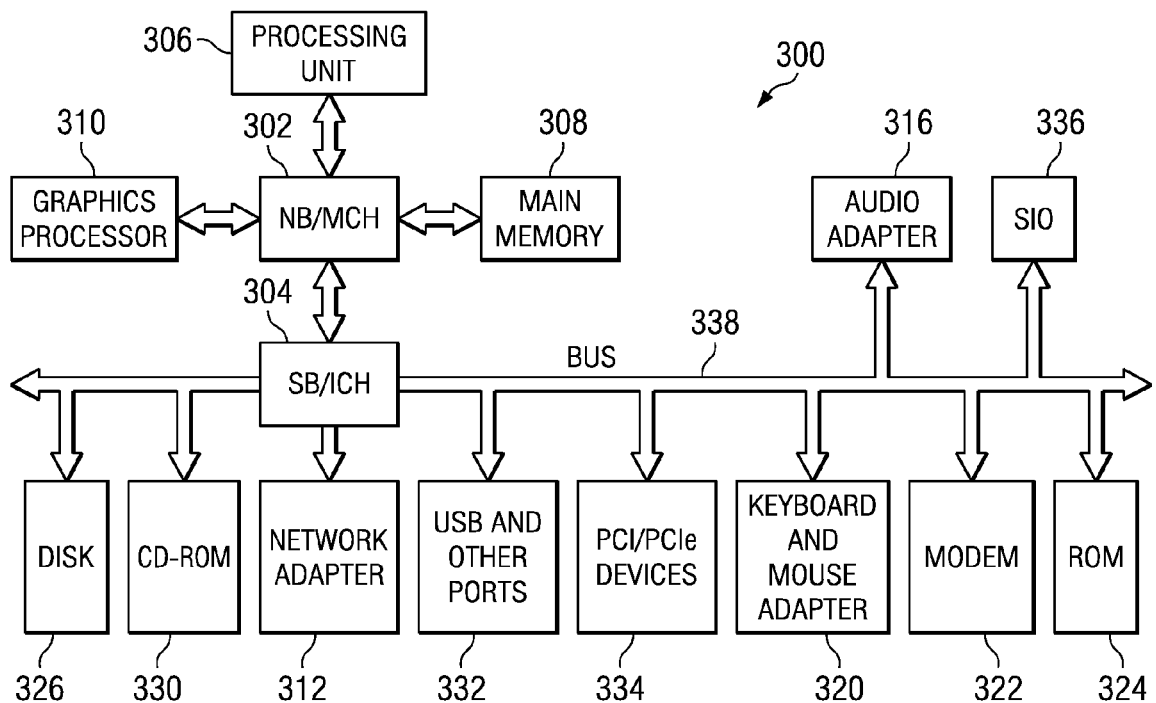
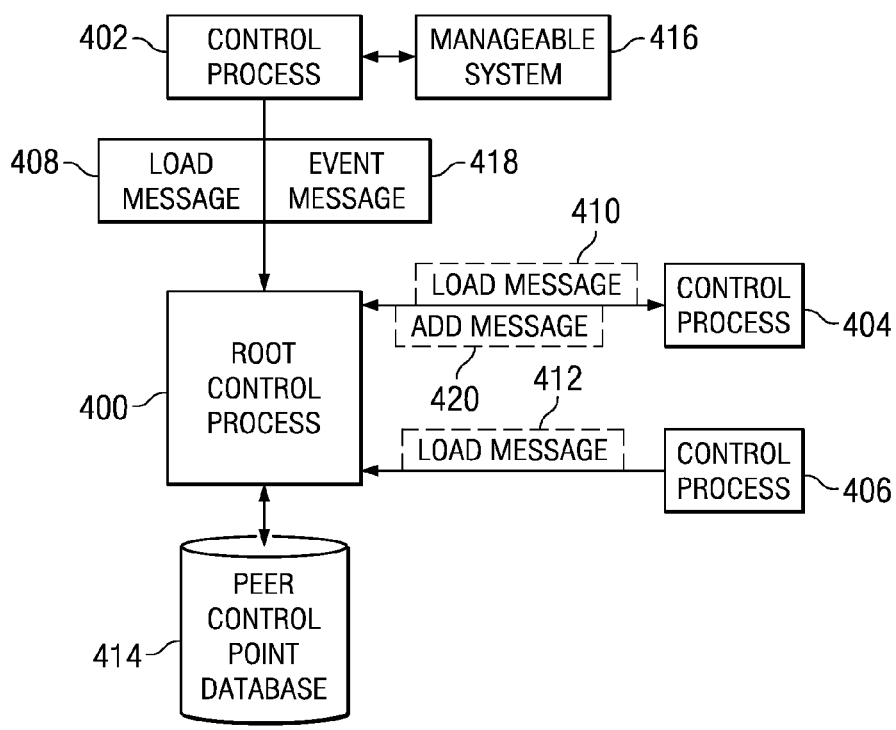

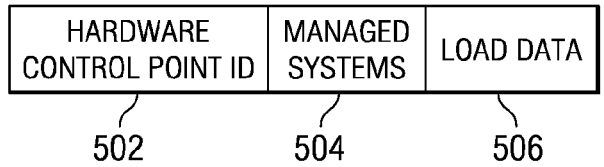
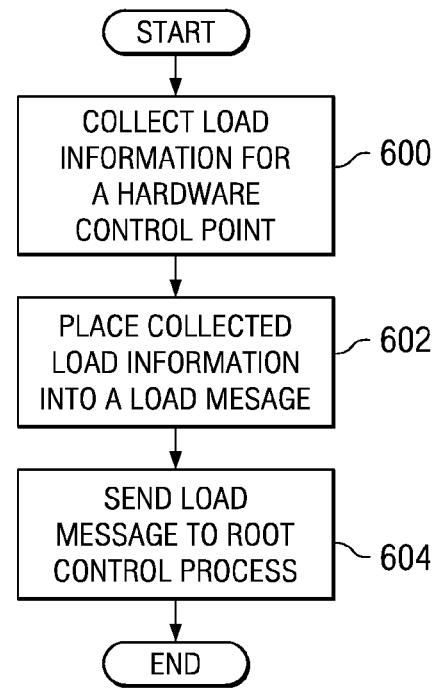
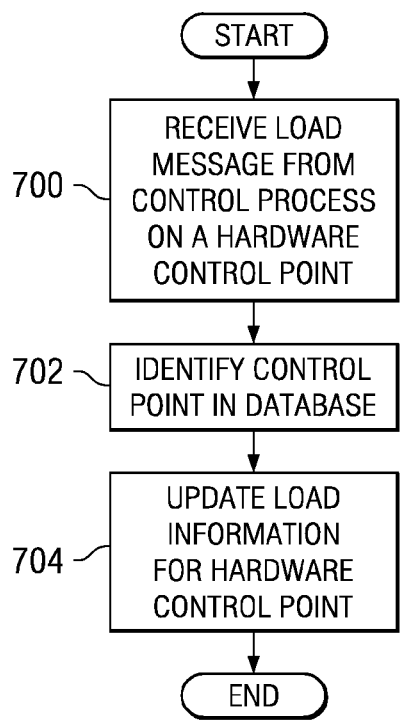
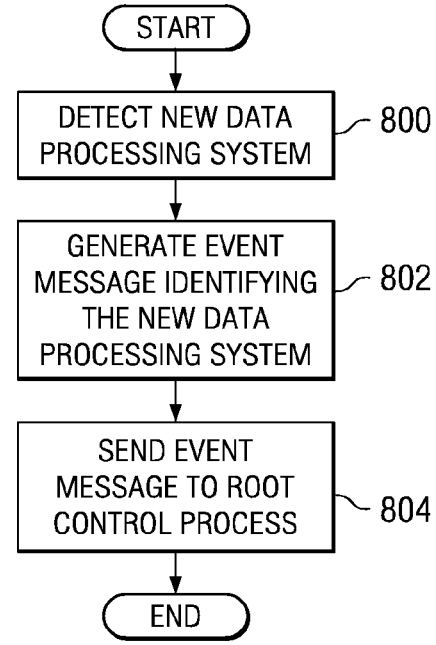

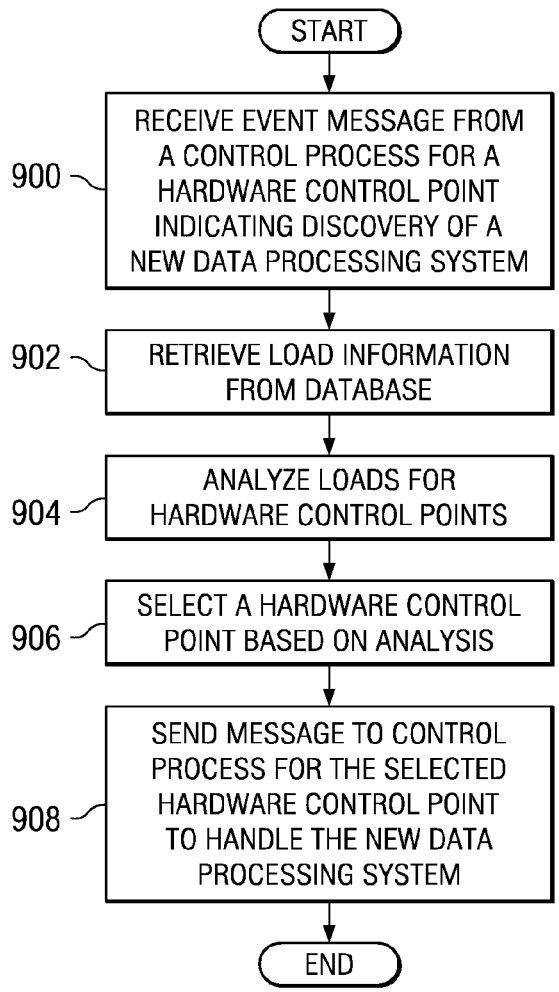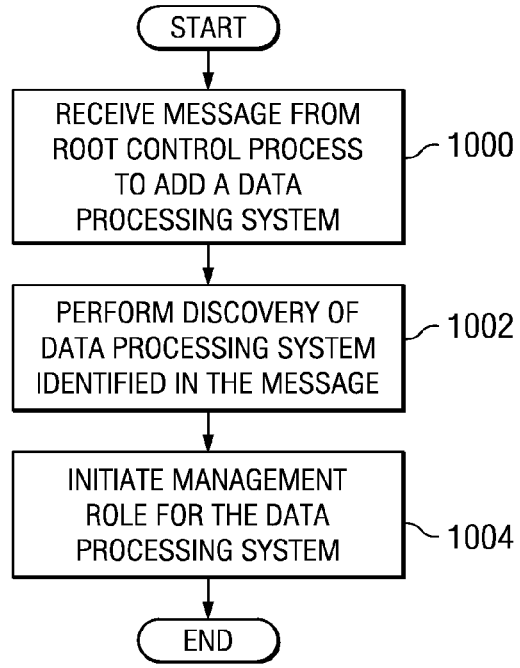

LOAD BALANCING MANAGEMENT OF NEWLY DISCOVERED DATA PROCESSING SYSTEMS USING PEER CONTROL POINTS

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for managing data processing systems.

2. Description of the Related Art

Businesses and other organizations are creating and maintaining increasingly complex heterogeneous server environments. Many of these environments may include different physical and virtual data processing systems to provide the computing power to service the requests made by clients. Many of these systems are becoming more virtualized in which operating systems lose visibility and control of the hardware in the data processing systems. To handle these two types of structures, heterogeneous and virtualization, hardware control points have been introduced.

A hardware control point is a device that coordinates operations across multiple operating system images and different types of data processing systems in a server environment. This type of device provides a point of control to manage physical hardware providing server services as well as the virtual server systems. Hardware control points provide management functions, which include configuring and maintaining the different types of servers within the server environment. A hardware control point is also referred to as a console or management console. Hardware control points provide a common user and programming interface to configure and maintain server systems. An example of a common function of a hardware control point is to begin management of a newly discovered server data processing system.

SUMMARY OF THE INVENTION

The illustrative embodiments provide a computer implemented method, apparatus, and computer usable program code for balancing management loads. A notification is received from a hardware control point indicating that a new manageable data processing system has been discovered, loads are analyzed for a plurality of hardware control points to form an analysis. One hardware control point is from the plurality of hardware control points using the analysis to form a selected hardware control point. A message is sent to the selected hardware control point to manage the new manageable data processing system, wherein the selected hardware control point manages the new manageable data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a data processing system shown in which illustrative embodiments may be implemented;

FIG. 4 is a diagram illustrating components used for balancing loads handled by hardware control points in accordance with an illustrative embodiment;

FIG. 5 is a diagram illustrating entries for storing load data in accordance with an illustrative embodiment;

FIG. 6 is a flowchart of a process for monitoring load information in accordance with an illustrative embodiment;

FIG. 7 is a flowchart of a process for receiving load information in accordance with an illustrative embodiment;

FIG. 8 is a flowchart of a process for detecting a new data processing system in accordance with an illustrative embodiment;

FIG. 9 is a flowchart of a process for selecting a hardware control point to manage a new manageable data processing system in accordance with an illustrative embodiment;

FIG. 10 is a flowchart of a process for initiating management of a data processing system in accordance with an illustrative embodiment.

DETAILED DESCRIPTION OF THE PREFERRED EMBODIMENT

Figure 1:
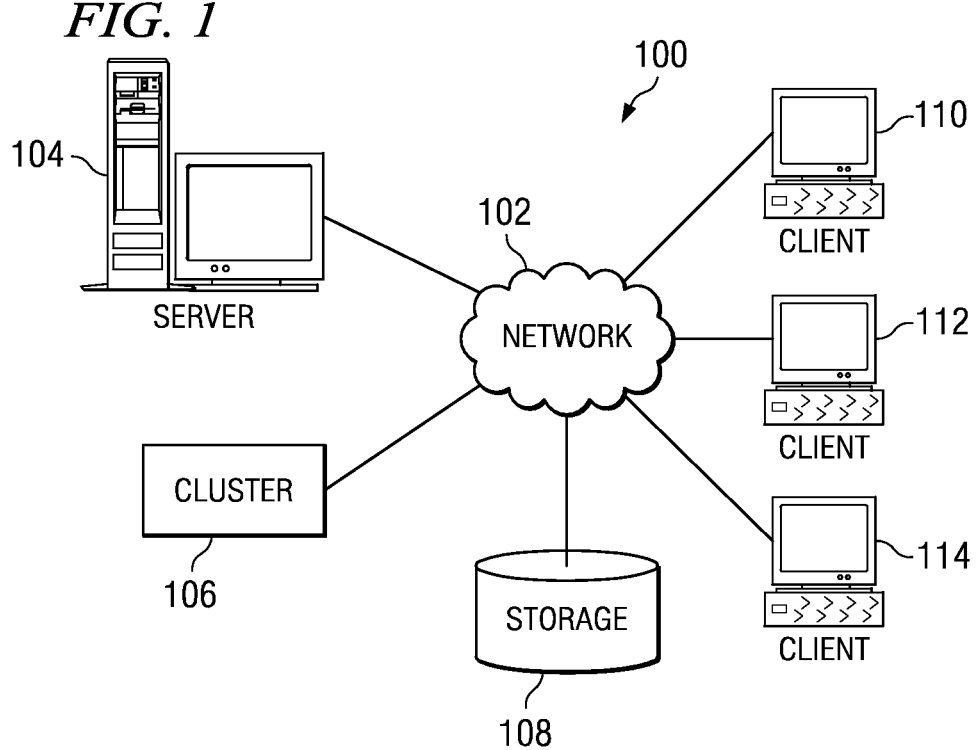
FIG. 1 depicts a pictorial representation of a network of data processing systems in which illustrative embodiments may be implemented.
Figure 2:
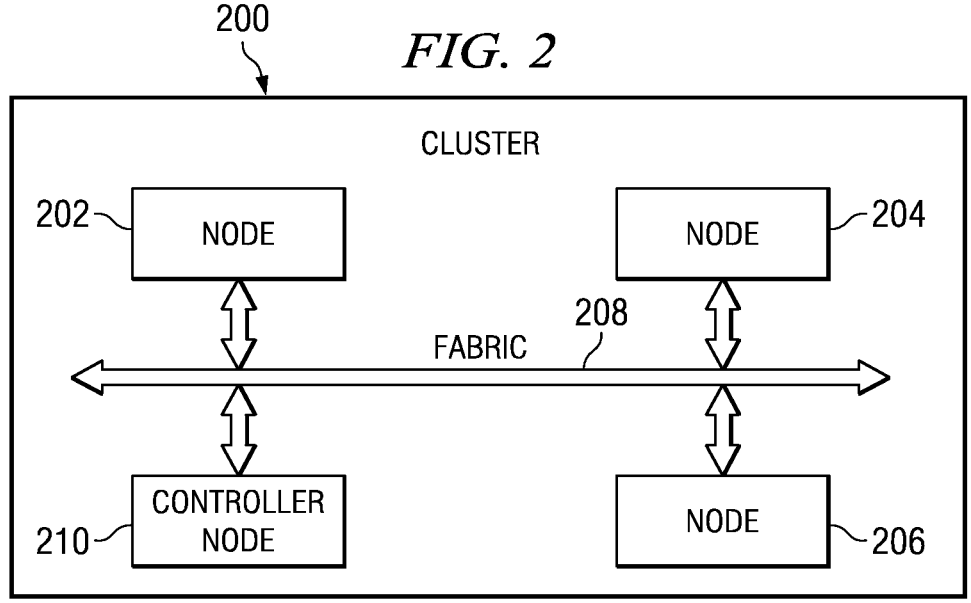
FIG. 2 is a diagram of a cluster in accordance with an illustrative embodiment.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and cluster 106 connect to network 102 along with storage unit 108. In addition, clients 110, 112, and 114 connect to network 102. In the depicted example, server 104 provides data, such as boot files, operating system images, and applications to clients 110, 112, and 114. Clients 110, 112, and 114 are clients to server 104 and cluster 106 in this example. Clients 110, 112, and 114 may be, for example, server data processing systems that are managed by server 104 and cluster 106. Clients 110, 112, and 114 may include virtual operating systems and may be configured as logical partitioned data processing systems in which multiple instances of operating systems execute on a single data processing system. Server 104 and cluster 106 act as hardware control points in these examples. Cluster 106 may itself act as a hardware control point, or the different nodes in cluster 106 may act as individual hardware control points depending on the implementation. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a cluster is depicted in accordance with an illustrative embodiment. In this particular example, cluster 200 is a more detailed example of cluster 106 in FIG. 1. Cluster 200 contains nodes 202, 204, and 206. These nodes communicate to each other through fabric 208. Fabric 208 may be implemented using any mechanism that allows the different nodes to communicate with each other. In this particular example, fabric 208 takes the form of a bus. Controller node 210 also connects to fabric 208. This node receives and routes requests to cluster 200 and routes them to nodes 202, 204, and 206. Further, controller node 210 also manages partition of these nodes. Controller node 210 may initiate the formation of partitions within the nodes to allow the partitions to work concurrently to process requests.

Although three nodes are depicted in cluster 200, different embodiments may be implemented using other numbers of nodes. For example, cluster 200 may be implemented using two or seven nodes. The actual number of nodes used within cluster 200 depends on the particular implementation.

With reference now to FIG. 3, a block diagram of a data processing system is shown in which illustrative embodiments may be implemented. Data processing system 300 is an example of a computer, such as server 104 or client 110 in FIG. 1, in which computer usable program code or instructions implementing the processes may be located for the illustrative embodiments.

In the depicted example, data processing system 300 employs a hub architecture including a north bridge and memory controller hub (NB/MCH) 302 and a south bridge and input/output (I/O) controller hub (SB/ICH) 304. Processing unit 306, main memory 308, and graphics processor 310 are coupled to north bridge and memory controller hub 302. Processing unit 306 may contain one or more processors and even may be implemented using one or more heterogeneous processor systems. Graphics processor 310 may be coupled to the NB/MCH through an accelerated graphics port (AGP), for example.

In the depicted example, local area network (LAN) adapter 312 is coupled to south bridge and I/O controller hub 304 and audio adapter 316, keyboard and mouse adapter 320, modem 322, read only memory (ROM) 324, universal serial bus (USB) and other ports 332, and PCI/PCIe devices 334 are coupled to south bridge and I/O controller hub 304 through bus 338, and hard disk drive (HDD) 326 and CD-ROM 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM 330 may use, for example, an integrated drive electronics (IDE) or serial advanced technology attachment (SATA) interface. A super I/O (SIO) device 336 may be coupled to south bridge and I/O controller hub 304.

An operating system runs on processing unit 306 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 300. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 326, and may be loaded into main memory 308 for execution by processing unit 306. The processes of the illustrative embodiments may be performed by processing unit 306 using computer implemented instructions, which may be located in a memory such as, for example, main memory 308, read only memory 324, or in one or more peripheral devices.

The hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 308 or a cache such as found in north bridge and memory controller hub 302. A processing unit may include one or more processors or CPUs. The depicted examples in FIGS. 1-3 and above-described examples are not meant to imply architectural limitations.

The different illustrative embodiments recognize that the current system of having a hardware control point manage a newly discovered server data processing system or other manageable system is an inefficient process in some cases when other hardware control points are present in the network data processing system. Depending on which hardware control point discovers a new data processing system, situations may arise in which one hardware control point has an unfair management responsibility in terms of the load managed by that particular hardware control point.

For example, assuming two hardware control points are present in a network data processing system, it is possible that one hardware control point remains idle while the other hardware control point manages all of the other data processing systems. As a result, the load on the second hardware control point may have an impact on performance as compared to having a more even distribution of managed data processing systems between the two hardware control points.

Thus, the illustrative embodiments provide a computer implemented method, apparatus, and computer usable program code for balancing management loads. In response to receiving a notification from a hardware control point indicating that a new manageable data processing system has been discovered, loads for hardware control points are analyzed to form an analysis. A manageable data processing system is a data processing system than can be managed by a control process on a hardware control point. A load is the current use of a data processing system. A load is usually measured as a percentage of the data processing system being used. One of the hardware control points is selected using the analysis to form a selected hardware control point. Then, a message is sent to the selected hardware control point to manage the new manageable data processing system. In response, the selected hardware control point manages the new manageable data processing system. This selected hardware control point may or may not be the same hardware control point sending the notification indicating that a new manageable data processing system has been discovered. The hardware control point that is chosen depends on the different loads being handled by the different hardware control points.

With reference now to FIG. 4, a diagram illustrating components used for balancing loads handled by hardware control points is depicted in accordance with an illustrative embodiment. In this example, root control process 400 is a process executing on a hardware control point, such as server 104 in FIG. 1 or node 202 in FIG. 2. In this example, control processes 402, 404, and 406 also are present. These control processes execute on other hardware control points such as those depicted in FIGS. 1 and 2.

In these illustrative examples, control processes 402, 404 and 406 monitor and collect statistics and other information about loads being handled by the different hardware control points. This load information may include, for example, processor usage, memory usage, and network bandwidth utilization. Examples of other load information include requests handled per period of time, number of requests in a queue, and number of requests received per period of time.

In these examples, load information is returned to root control process 400 from control processes 402, 404, and 406. This load information may include one or more of the metrics or parameters being monitored at the hardware control points. Further, root control process 400 also may monitor its own metrics for use in determining load balancing with respect to the hardware control points.

This information is returned to root control process 400 in the form of load messages. For example, control process 402 sends load message 408 to root control process 400, and control process 404 sends load message 410 to root control process 400. In a similar fashion, control process 406 sends load message 412 to root control process 400.

These load messages may be sent periodically or based upon some other event. Further, the event may be a polling signal generated by root control process 400, depending on the particular implementation. The load information received from load messages 408, 410, and 412 are stored in peer control point database 414.

When a data processing system, such as manageable system 416 is discovered, root control process 400 selects the hardware control point that will be used to manage manageable system 416. In these examples, control process 402 discovers manageable system 416. In response to discovering manageable system 416, control process 402 sends event message 418 to root control process 400. Control process 402 may discover manageable system 416 through different mechanisms. For example, a service location protocol (SLP) multicast may be used to discover new systems. This type of multicast is part of the TCP/IP protocols.

Upon receiving event message 418 indicating that manageable system 416 has been discovered by control process 402, root control process 400 performs a load balancing analysis using the load information stored in peer control point database 414. The particular type of analysis used to identify which control process at a hardware control point is to manage manageable system 416 depends on the particular implementation. The different embodiments are not meant to be restricted to a particular type of load balancing analysis.

Once a particular hardware control point has been identified, a message is sent to that control process to begin discovery and management of manageable system 416. In this example, control process 404 has been selected, and root control process 400 sends add message 420 to control process 404. In response to receiving add message 420, control process 404 at the hardware control point begins a discovery of manageable system 416 and then initiates its management role over this component.

In these examples, root control process 400 also stores an identification of which control processes are managing which systems within peer control point database 414. In this manner, root control process 400 is able to find the best candidate to manage manageable system 416 based on a load balancing analysis of data between peer control point database 414. In the depicted examples, root control process 400 seeks to select a control process on a hardware control point that has the least resource utilization.

In these examples, manageable system 416 is a server data processing system. Manageable system 416 may take the form of a virtual or hardware data processing system.

The different embodiments illustrated in these examples may be implemented in currently available cluster management systems. For example, the different embodiments may be implemented in IBM Director and IBM Cluster Systems Management for AIX 5L and Linux, which are both products available from International Business Machines Corporation.

Turning now to FIG. 5, a diagram illustrating entries for storing load data is depicted in accordance with an illustrative embodiment. In this particular example, entry 500 is an example of an entry in a database, such as peer control point database 414 in FIG. 4. Entry 500 contains hardware control point ID 502, managed systems 504, and load data 506.

Hardware control point ID 502 is an identifier of the hardware control point in the network data processing system. This identification may be, for example, one selected by an administrator or may be based on hardware identification information in the hardware control point. Managed systems 504 contains an identification of the different data processing systems being managed by the particular hardware control point. Load data 506 contains information on the loads being handled by the hardware control point. Load data 506 is updated based on load messages, such as load message 408 in FIG. 4 being received by the root control process.

Turning now to FIG. 6, a flowchart of a process for monitoring load information is depicted in accordance with an illustrative embodiment. In this example, the process illustrated in FIG. 6 may be implemented in a control process on a hardware control point, such as control process 402 in FIG. 4.

The process begins by collecting load information for a hardware control point (step 600). This hardware control point is the hardware control point on which the control process is executing in these examples. The collected load information is placed into a load message (step 602). Thereafter, the load message is sent to a root control process (step 604) with the process terminating thereafter.

With reference to FIG. 7, a flowchart of a process for receiving load information is depicted in accordance with an illustrative embodiment. The process illustrated in FIG. 7 may be implemented in a root control process, such as root control process 400 in FIG. 4.

The process begins by receiving a load message from a control process on a hardware control point (step 700). Thereafter, the control point from which the load message was received was identified in a database (step 702). In this example, the database is a database of load information, such as peer control point database 414 in FIG. 4. The load information for the particular hardware control point is updated (step 704) with the process terminating thereafter.

Turning now to FIG. 8, a flowchart of a process for detecting a new data processing system is depicted in accordance with an illustrative embodiment. The process illustrated in FIG. 8 may be implemented in a control process, such as control process 402 in FIG. 4.

The process begins by detecting a new data processing system (step 800). The detection of a new data processing system may be implemented using a number of different mechanisms. In these examples, the control process sends out an SLP multicast to identify new data processing systems. Depending on the implementation, the new data processing systems themselves may initiate the messages that result in the discovery of the new data processing systems.

Next, an event message is generated identifying the new data processing system (step 802). This message may include information, such as an identifier for the new data processing system as well as the type of the new data processing system. Information that may be included other than an identification of the new data processing system may vary depending on the implementation. Thereafter, the event message is sent to the root control process (step 804) with the process terminating thereafter.

This sequence of steps in FIG. 8 differs from the currently used mechanisms because the control process on the hardware control point discovering the new data processing system does not necessarily initiate management of the new data processing system. Instead, the root control process performs load balancing to select a hardware control point to manage the newly discovered data processing system.

Turning now to FIG. 9, a flowchart of a process for selecting a hardware control point to manage a new manageable data processing system is depicted in accordance with an illustrative embodiment. The process illustrated in FIG. 9 may be implemented in a root control process, such as root control process 400 in FIG. 4.

The process begins by receiving an event message from a control process for a hardware control point indicating discovery of a new data processing system (step 900). Thereafter, load information for the different hardware control points in the network data processing system is retrieved from a database (step 902). In these examples, the database is, for example, peer control point database 414 in FIG. 4. The root control process then performs an analysis of the loads for the hardware control point (step 904).

A hardware control point is selected to manage the newly discovered data processing system based on the analysis (step 906). Thereafter, a message is sent to the control process for the selected hardware control point to handle the newly discovered data processing system (step 908) with the process terminating thereafter.

Turning now to FIG. 10, a flowchart of a process for initiating management of a data processing system is depicted in accordance with an illustrative embodiment. In these examples, the process illustrated in FIG. 10 may be implemented in a control process, such as control process 404 in FIG. 4.

The process begins by receiving a message from a root control process to add a data processing system (step 1000). In these examples, the data processing system is a newly discovered data processing system that may or may not have been discovered by the control process on the hardware control point. Next, a discovery of the data processing system identified in the message is performed (step 1002). This discovery involves obtaining information necessary to control the manageable data processing system in these examples. Then, the management role for the data processing system is initiated (step 1004) with the process terminating thereafter.

Figure 11:
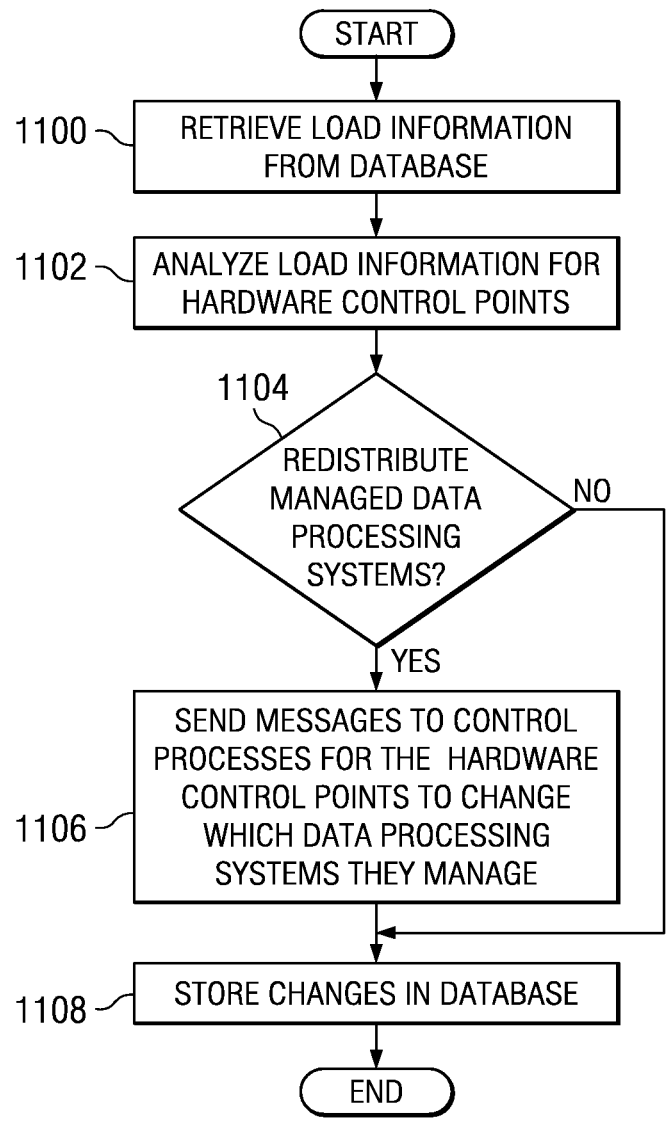
FIG. 11 is a flowchart of a process for load balancing management of a managed data processing system in accordance with an illustrative embodiment.

With reference now to FIG. 11, a flowchart of a process for load balancing management of a managed data processing system is depicted in accordance with an illustrative embodiment. The process illustrated in FIG. 11 may be implemented in a control process, such as root control process 400 in FIG. 4.

The process begins by retrieving load information from a database (step 1100). Next, the load information is analyzed for the hardware control points (step 1102). Next, a determination is made as to whether the managed data processing systems should be redistributed between the hardware control points from the current distribution based on the analysis (step 1104). If a redistribution is needed, messages are sent to one or more control processes for the hardware control points to change which data processing systems they manage (step 1106). Thereafter, the changes are stored in the database (step 1108) with the process terminating thereafter.

With reference again to step 1104, if the analysis indicates that a redistribution of the managed data processing system is not needed, then the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different illustrative embodiments provide a computer implemented method, apparatus, and computer usable program code for balancing management loads for hardware control points. In response to the notification from the hardware control point indicating that a new manageable data processing system has been discovered, loads for hardware control points are analyzed to form an analysis. One of the hardware control points is selected using the analysis. This selected hardware control point is sent a message to indicate that the selected hardware control point is to manage the new manageable data processing system.

In this manner, the loads handled by different hardware control points in the network data processing system may be more evenly distributed as compared to the currently used mechanism in which the hardware control point discovering the new manageable data processing system actually initiates management of that system. In this manner, loads may be analyzed and balanced as new data processing systems are encountered for management. Further, the different illustrative embodiments may be applied to redistribute management of data processing systems depending on the loads being handled by those different hardware control points.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for balancing management loads in a network having a plurality of hardware control points, the computer implemented method comprising:

storing, by a first one of the plurality of hardware control points, in a peer control point database a plurality of hardware control point identifiers, each of the plurality of hardware control point identifiers associated with at least one managed system and a plurality of load data, wherein each of the one or more managed systems identifies a different data processing system that is being managed by a particular hardware control point and a particular load data contains information on loads being handled by the particular hardware control point and a percentage of the data processing system being used;

responsive to receiving a load message associated with the particular hardware control point, updating, by the first one of the plurality of hardware control points, the load data associated with an identifier of the particular hardware control point in the peer control point database;

sending out a service location protocol multicast from a second one of the plurality of hardware control points to identify a new manageable data processing system;

responsive to identifying the new manageable data processing system, generating an event message by the second one of the plurality of hardware control point and sending the event message to the first one of the plurality of hardware control points;

responsive to receiving the event message indicating that the new manageable data processing system has been discovered, retrieving, by the first one of the plurality of hardware control points, a plurality of load data associated with the plurality of hardware control point identifiers from the peer control database;

responsive to retrieving the plurality of load data associated with the plurality of hardware control point identifiers from the peer control database, analyzing loads, by the first one of the plurality of hardware control points, for the plurality of hardware control points to form an analysis;

selecting, by the first one of the plurality of hardware control points, a third one of the plurality of hardware control points using the analysis;

sending a load message from the first one of the plurality of hardware control points to the third one of the plurality of hardware control points to manage the new manageable data processing system;

responsive to receiving the load message, initiating, by the third one of the plurality of hardware control points, discovery of the new manageable data processing system; and initiating, by the third one of the plurality of hardware control points, a management role over the new manageable data processing system after the discovery.

2. The computer implemented method of claim 1, wherein the load data comprises processor usage, memory usage, and network bandwidth utilization.

3. The computer implemented method of claim 1, wherein the third one of the plurality of hardware control point is another hardware control point other than the second one of the plurality of hardware control point that sent the event message.

4. The computer implemented method of claim 1, wherein the plurality of hardware control points includes physical data processing systems and virtual data processing systems.

5. The computer implemented method of claim 1, wherein the computer implemented method is executed on a root control process.

6. A network data processing system comprising:
a network;
a plurality of manageable data processing systems;
a peer control point database;
one or more processors, one or more computer readable memories, and one or more computer-readable tangible storage devices;
program instructions, stored on the one or more computer-readable tangible storage devices for execution via the one or more computer readable memories for storing, by a first one of the plurality of hardware control points, in the peer control point database a plurality of hardware control point identifiers, each of the plurality of hardware control point identifiers associated with at least one managed system and a plurality of load data, wherein each of the one or more managed systems identifies a different data processing system that is being managed by a particular hardware control point and a particular load data contains information on loads being handled by the particular hardware control point and a percentage of the data processing system being used;

program instructions, stored on the one or more computer-readable tangible storage devices for execution via the one or more computer readable memories, responsive to receiving a load message associated with the particular hardware control point, for updating, by the first one of the plurality of hardware control points, the load data associated with an identifier of the particular hardware control point in the peer control point database;

program instructions, stored on the one or more computer-readable tangible storage devices for execution via the one or more computer readable memories, for sending out a service location protocol multicast from a second one of the plurality of hardware control points to identify a new manageable data processing system;

program instructions, stored on the one or more computer-readable tangible storage devices for execution via the one or more computer readable memories, responsive to identifying the new manageable data processing system, generating an event message by the second one of the plurality of hardware control point and sending the event message to the first one of the plurality of hardware control points;

program instructions, stored on the one or more computer-readable tangible storage devices for execution via the one or more computer readable memories, responsive to receiving the event message indicating that a new manageable data processing system has been discovered, for retrieving, by the first one of the plurality of hardware control points, a plurality of load data associated with the plurality of hardware control point identifiers from the peer control database;

program instructions, stored on the one or more computer-readable tangible storage devices for execution via the one or more computer readable memories, responsive to retrieving the plurality of load data associated with the plurality of hardware control point identifiers from the peer control database, for analyzing loads, by the first one of the plurality of hardware control points, for the plurality of hardware control points to form an analysis;

program instructions, stored on the one or more computer-readable tangible storage devices for execution via the one or more computer readable memories for selecting, by the first one of the plurality of hardware control points, a third one of the plurality of hardware control points using the analysis;

program instructions, stored on the one or more computer-readable tangible storage devices for execution via the one or more computer readable memories for sending a load message from the first one of the plurality of hardware control points to the third one of the plurality of hardware control points to manage the new manageable data processing system;

program instructions, stored on the one or more computer-readable tangible storage devices for execution via the one or more computer readable memories, responsive to receiving the load message, for initiating, by the third one of the plurality of hardware control points, discovery of the new manageable data processing system; and program instructions, stored on the one or more computer-readable tangible storage devices for execution via the one or more computer readable memories, for initiating, by the third one of the plurality of hardware control points, a management role over the new manageable data processing system after the discovery.

7. A data processing system comprising:

a bus;

a communications unit connected to the bus;

one or more computer-readable tangible storage devices connected to the bus;

a peer control point database;

one or more processors connected to the bus;

one or more computer readable memories connected to the one or more processors;

program instructions, stored on the one or more computer-readable tangible storage devices for execution via the one or more computer readable memories for storing, by a first one of the plurality of hardware control points, in the peer control point database a plurality of hardware control point identifiers, each of the plurality of hardware control point identifiers associated with at least one managed system and a plurality of load data, wherein each of the one or more managed systems identifies a different data processing system that is being managed by a particular hardware control point and a particular load data contains information on loads being handled by the particular hardware control point and a percentage of the data processing system being used;

program instructions, stored on the one or more computer-readable tangible storage devices for execution via the one or more computer readable memories, responsive to receiving a load message associated with the particular hardware control point, for updating, by the first one of the plurality of hardware control points, the load data associated with an identifier of the particular hardware control point in the peer control point database;

program instructions, stored on the one or more computer-readable tangible storage devices for execution via the one or more computer readable memories, for sending out a service location protocol multicast from a second one of the plurality of hardware control points to identify a new manageable data processing system;

program instructions, stored on the one or more computer-readable tangible storage devices for execution via the one or more computer readable memories, responsive to identifying the new manageable data processing system, generating an event message by the second one of the plurality of hardware control point and sending the event message to the first one of the plurality of hardware control points;

program instructions, stored on the one or more computer-readable tangible storage devices for execution via the one or more computer readable memories, responsive to receiving the event message indicating that the new manageable data processing system has been discovered, retrieving, by the first one of the plurality of hardware control points, a plurality of load data associated with the plurality of hardware control point identifiers from the peer control database;

program instructions, stored on the one or more computer-readable tangible storage tangible devices for execution via the one or more computer readable memories, responsive to retrieving the plurality of load data associated with the plurality of hardware control point identifiers from the peer control database, analyzing loads, by the first one of the plurality of hardware control points, for the plurality of hardware control points to form an analysis;

program instructions, stored on the one or more computer-readable tangible storage tangible devices for execution via the one or more computer readable memories for selecting, by the first one of the plurality of hardware control points, a third one of the plurality of hardware control points using the analysis;

program instructions, stored on the one or more computer-readable tangible storage tangible devices for execution via the one or more computer readable memories for sending a load message from the first one of the plurality of hardware control points to the third one of the plurality of hardware control points to manage the new manageable data processing system;

program instructions, stored on the one or more computer-readable tangible storage tangible devices for execution via the one or more computer readable memories responsive to receiving the load message, initiating, by the third one of the plurality of hardware control points, discovery of the new manageable data processing system; and program instructions, stored on the one or more computer-readable tangible storage tangible devices for execution via the one or more computer readable memories initiating, by the third one of the plurality of hardware control points, a management role over the new manageable data processing system after the discovery.

8. The data processing system of claim 7, wherein a load data comprises processor usage, memory usage, and network bandwidth utilization.

9. The data processing system of claim 7, wherein the third one of the plurality of hardware control point is another hardware control point other than the second one of the plurality of hardware control point that sent the event message.

10. A computer program product comprising:

one or more non-transitory computer-readable tangible storage devices;

program instructions, stored on the one or more non-transitory computer-readable tangible storage devices for storing, by a first one of the plurality of hardware control points, in the peer control point database a plurality of hardware control point identifiers, each of the plurality of hardware control point identifiers associated with at least one managed system and a plurality of load data, wherein each of the one or more managed systems identifies a different data processing system that is being managed by a particular hardware control point and a particular load data contains information on loads being handled by the particular hardware control point and a percentage of the data processing system being used;

program instructions, stored on the one or more non-transitory computer-readable tangible storage devices, responsive to receiving a load message associated with the particular hardware control point, for updating, by the first one of the plurality of hardware control points, the load data associated with an identifier of the particular hardware control point in the peer control point database;

program instructions, stored on the one or more non-transitory computer-readable tangible storage devices, for sending out a service location protocol multicast from a second one of the plurality of hardware control points to identify a new manageable data processing system;

program instructions, stored on the one or more non-transitory computer-readable tangible storage devices, responsive to identifying the new manageable data processing system, generating an event message by the second one of the plurality of hardware control point and sending the event message to the first one of the plurality of hardware control points;

program instructions, stored on the one or more non-transitory computer-readable tangible storage devices, responsive to receiving the event message indicating that the new manageable data processing system has been discovered, retrieving by the first one of the plurality of hardware control points, a plurality of load data associated with the plurality of hardware control point identifiers from the peer control database;

program instructions, stored on the one or more non-transitory computer-readable tangible storage tangible devices, responsive to retrieving the plurality of load data associated with the plurality of hardware control point identifiers from the peer control database, analyzing loads, by the first one of the plurality of hardware control points, for the plurality of hardware control points to form an analysis;

program instructions, stored on the one or more non-transitory computer-readable tangible storage tangible devices for selecting, by the first one of the plurality of hardware control points, a third one of the plurality of hardware control points using the analysis;

program instructions, stored on the one or more non-transitory computer-readable tangible storage tangible devices for sending a load message from the first one of the plurality of hardware control points to the third one of the plurality of hardware control points to manage the new manageable data processing system;

program instructions, stored on the one or more non-transitory computer-readable tangible storage tangible devices responsive to receiving the load message, initiating, by the third one of the plurality of hardware control points, discovery of the new manageable data processing system; and program instructions, stored on the one or more non-transitory computer-readable tangible storage tangible devices for initiating, by the third one of the plurality of hardware control points, a management role over the new manageable data processing system after the discovery.

11. The computer program product of claim 10, wherein a load data comprises processor usage, memory usage, and network bandwidth utilization.

12. The computer program product of claim 10, wherein the third one of the plurality of hardware control point is another hardware control point other than the second one of the plurality of hardware control point that sent the event message.

13. The computer program product of claim 10, wherein the plurality of hardware control points includes physical data processing systems and virtual data processing systems.

* * * * *